United States Patent
McLaughlin et al.

[15] 3,676,380
[45] July 11, 1972

[54] LOW FRIABILITY POLYISOCYANURATE FOAMS

[72] Inventors: Alexander McLaughlin, Meriden; James S. Rose, Guildford, both of Conn.

[73] Assignee: The Upjohn Company, Kalamazoo, Mich.

[22] Filed: May 19, 1969

[21] Appl. No.: 825,941

[52] U.S. Cl..............260/2.5 AW, 260/2.5 AM, 260/2.5 AT, 260/453 A
[51] Int. Cl........................................................C08g 22/48
[58] Field of Search..........................260/2.5 AT, 2.5 AW

[56] References Cited

UNITED STATES PATENTS

| 3,248,372 | 4/1966 | Bunge | 260/77.5 |
|---|---|---|---|
| 3,394,164 | 7/1968 | McClellan et al | 260/453 |

FOREIGN PATENTS OR APPLICATIONS

| 250,101 | 3/1964 | Australia | 260/2.5 |
|---|---|---|---|
| 1,155,768 | 6/1969 | Great Britain | |
| 1,478,759 | 3/1967 | France | 260/2.5 |

Primary Examiner—Donald E. Czaja
Assistant Examiner—H. S. Cockeram
Attorney—Denis A. Firth and John Kekich

[57] ABSTRACT

High temperature resistant, flame resistant polyisocyanurate polymers with superior characteristics of friability are disclosed. These polymers are obtained by first preparing an isocyanate-terminated prepolymer consisting of 1 percent to 10 percent by weight of an aliphatic diol and 99 to 90 percent by weight of a polymethylene polyphenyl isocyanate (consisting of 35 to 85 percent by weight of methylenebis(phenyl isocyanate). The prepolymer is polymerized in the presence of a tertiary amine and a monomeric homocyclic polyepoxide and/or a polyol. The novel foams, useful in thermal insulation and like applications where resistance to high temperatures and low flame spread requirements must be met, are particularly useful in applications where vibration is a factor, having a friability factor approximately one half that of prior isocyanurate linked cellular foams.

12 Claims, No Drawings

LOW FRIABILITY POLYISOCYANURATE FOAMS

BACKGROUND OF THE INVENTION

1. Field of the Invention

This invention relates to a novel process for the preparation of low density, high temperature resistant, flame resistant polyisocyanurate linked foams with improved properties of friability and stability. More particularly, it is concerned with a method of preparing said cellular polymers by the prepolymer method, using an isocyanate-terminated prepolymer which is the reaction product of polymethylene polyphenyl isocyanates and certain aliphatic diols and with the cellular polymers so prepared.

2. Description of the Prior Art

High temperature resistant, flame resistant cellular foams consisting essentially of polyisocyanurate linkages have been developed, and methods of making them by both prepolymer and one-shot techniques are well-known, for example as disclosed in British Pat. No. 1,104,394 (General Tire & Rubber Co.). The basic difference between this invention and prior methods, however, is in the unexpected physical properties of the foam produced thereby. Polyisocyanurate foams are characterized by their high degree of friability. Friability is a phenomenon well-known, but not fully understood, by those skilled in the art. It would appear to be related to a number of factors, including density of cross-links, cell size, cell shape and bond strengths. More easily understood is the fact that usefulness of a foam decreases with increase of its friability. The more friable foams require special handling, and transportation. Their applications are limited to vibration free installations, and therefore it is extremely desirable to improve this property in high temperature resistant, flame resistant foams.

A standard measurement of friability exists in ASTM test C-421-1 and is expressed as per cent weight loss by abrasion over a given period of time. For example, a pure polyisocyanurate trimer foam will show approximately 60 percent friability (weight loss) for a ten minute test period. For comparison purposes, a polyurethane type cellular foam would test at about 10 percent to 20 percent friability.

We now find that by using a particular class of isocyanate-terminated prepolymers as the polyisocyanate component, it is possible to prepare low density, high temperature resistant, flame resistant polyisocyanurate polymers with superior physical properties, i.e.: as low as about 7 percent – 25 percent friability [(weight loss)/10 minute period (ASTM C-421-61)] i.e. markedly lower than the friability of corresponding foams prepared without the use of the prepolymers of the invention. This finding is clearly novel and unexpected, being neither taught nor suggested by the prior art. This finding is also clearly valuable, representing a significant step forward in the art.

Our findings as the advantages of using the particular group of isocyanate-prepolymers derived from certain diols are particularly surprising in that we have found that closely related experiments, such as the use of corresponding monohydric aliphatic alcohols or of other monofunctional active hydrogen containing compounds in association with the polyisocyanate, not only did not decrease friability of the resultant foams but actually increased this undesirable feature.

SUMMARY OF THE INVENTION

The process of the invention, in its broadest aspect, is a process for the preparation of high temperature resistant, low flame spread cellular polymers with improved friability properties.

The process comprises bringing together, under foam producing conditions:

A. An isocyanate-terminated prepolymer which is the reaction product, of (i) 1 percent to 10 percent by weight of a diol selected from the group consisting of straight chain lower-alkylene diol, straight chain lower-alkenylene diol, straight chain halo-substituted lower-alkylene diol and straight chain halo-substituted lower-alkenylene diol and (ii) 99 percent to 90 percent by weight of a polyisocyanate containing from about 35 percent to 85 percent by weight methylenebis(phenyl isocyanate);

B. from about 0.01 to about 0.25 equivalent, per equivalent of said prepolymer mixture, of a tertiary amine;

C. from about 0 to about 0.5 equivalent, per equivalent of said prepolymer mixture, of a monomeric homocyclic polyepoxide;

D. from about 0 to about 0.3 equivalent, per equivalent of said prepolymer, of a polyol having an average functionality of from two to eight and an average hydroxyl equivalent weight of from about 30 to about 1500;

provided that when no polyol (D) is present, the monomeric homocyclic polyepoxide (C) is present in an amount of from about 0.0045 to about 0.5 equivalent per equivalent of prepolymer and further provided that when no monomeric homocyclic polyepoxide (C) is present the polyol (D) is present in an amount of from about 0.01 to about 0.3 equivalent per equivalent of prepolymer.

The invention also includes the cellular polymers obtained by the above process and by the various embodiments thereof which are set forth herein.

DETAILED DESCRIPTION OF THE INVENTION

The general procedures for preparing isocyanate-terminated prepolymers and reacting said prepolymers to produce cellular rigid foams are old and well-known in the art. See for example Saunders and Frisch, "Polyurethanes: Chemistry and Technology, II Technology", Pgs. 193 – 239, Interscience Publishers, New York 1964. Thus, a prepolymer is prepared by mixing 1 percent to 10 percent by weight diol (II) as hereinafter defined with 99 percent to about 90 percent by weight of polyisocyanate (III) as hereinafter defined.

The mixing and later storage of the polyisocyanate (III) and diol (II) are done under conditions which exclude atmospheric moisture, such as mixing under a blanket of nitrogen gas, a technique well-known by those skilled in the art. Mixing proceeds in a temperature range of 50° C to 70° C, the optimum temperature for mixing being 60° C, to avoid excessive viscosity increase. Maximum viscosity in a range of 600 cps to 23,000 cps, is reached in one to three hours, indicating substantial completion of the reaction. The mixing can be accomplished on any scale, using appropriate mixing means either by hand or conventional mixing machines or agitators well-known in the art. Upon standing for several days (atmospheric moisture excluded by storage in sealed containers) the reaction may continue, slowly, the mixture building up to a preferred maximum viscosity of about 1,000 cps to 6,500 cps at 25° C.

The diol (II) employed in preparing the prepolymer is a member of the class consisting of straight chain lower-alkylene diols, straight chain lower-alkenylene diols, straight chain halo-substituted lower-alkylene diols and straight chain halo-substituted lower-alkenylene diols. The preferred diol (II) is a straight chain halo-substituted lower-alkenylene diol. The term "straight chain lower-alkylene diol" as used throughout this specification and claims means a straight chain alkane of from two to six carbons having one hydroxyl group attached to each terminal carbon.

Examples of straight chain lower-alkylene diols as hereinbefore defined are 1,2-ethanediol, 1,3-propanediol, 1,4-butanediol, 1,5-pentanediol and 1,6-hexanediol, compounds which are old and well-known in the art.

The term "halo" as used throughout this specification and claims means fluorine, chlorine, bromine, and iodine.

The term "straight chain halo-substituted lower-alkylene diol" as used throughout this specification and claims means a straight chain lower-alkylenediol as hereinbefore defined, in which any or all hydrogen attached to a non-terminal carbon is substituted by halogen.

Representative examples of straight chain halo-substituted lower-alkylene diols are 2,2-difluoro-1,3-propanediol; 2,2,3,3-tetrafluoro-1,4-butanediol; 2,2,3,3,4,4-hexafluoro-1,5-pentanediol all of which can be prepared by the method of McBee et al., see J. Am. Chem.Soc., Vol. 74, pp. 444–6 (1952); 2,3-dichloro-1,4-butanediol and 2,3-dibromo-1,4-butanediol which can be prepared by the method of W.F.Beech (J.Chem.Soc. 1951, pp. 2483-7); 2,2-dichloro-1,4-butanediol which can be prepared by the method of A.W.Johnson, [J.Chem.Soc. (1946) pp. 1009–14].

The term "straight chain lower-alkenylene diol" as used throughout this specification and claims means a straight chain alkene of from four to six carbons wherein there is attached one hydroxy group to each terminal carbon and a double bond is positioned between two non-terminal carbons.

Examples of straight chain lower alkenylene diol are 1,4-but-2-enediol, 1,5-pent-2-enediol, 1,6-hex-2-enediol, and 1,6-hex-3-enediol, compounds which are old and the preparation of which is well-known to those skilled in the art. For example the lower-alkylenediols can be prepared by catalytic hydrogenation of the corresponding alkynediol, using techniques well-known to those skilled in the art, for example as described in U.S. Pat. No. 2,953,604 (Hort) for preparation of 1,4-butenediol or German Patent 1,139,832 (Hort and Graham) for the preparation of 2-buten-1,4-diol from 2-butyn-1,4-diol.

The term "straight chain halo-substituted lower-alkenylenediol" as used throughout this specification and claims means a straight chain lower-alkenylenediol as hereinbefore defined, in which any or all hydrogens attached to non-terminal carbon atoms is replaced by halogen. The straight chain halo-substituted lower-alkenylenediols are for the most part wellknown, and can be prepared by addition of halogen to the corresponding alkynediols; see for example the method of A.W.Johnson, J.Chem.Soc., 1946, pg. 1014, which details the preparation of 2,3-diiodo-2-buten-1,4-diol, 2,3-dibromobut-2-en-1,4-diol, and 2-chloro-2-buten-1,4-diol from 2-butyn-1,4-diol. In the same manner, 2-hexyne-1,6-diol (Paul et al., Compt.Rend., 230, pp. 1872-3, 1950) and 2-pentyne-1,5-diol (Heuberger et al., J.Chem.Soc., 1952, pp. 910-14) can be halogenated to yield the corresponding straight chain mono and dihalo-substituted lower-alkenylenediols. Other examples of halo-substituted lower-alkenylenediols are 2-bromo-3-chloro-2-butene-1,4-diol and 2-chloro-3-iodo-2-butene-1,4-diol (Nesmeyanov et al. Otdel.Khim.Nauk, 1949 (Russia) pp. 76–82). The preferred straight chain halo-substituted lower-alkenylenediol is 2,3-dibromo-22-butene-1,4-diol.

The polyisocyanate component (III) employed in preparation of the prepolymer is a polyisocyanate containing from about 35 to about 85 percent by weight of methylenebis(phenyl isocyanate) the remainder of said polyisocyanate being comprised of closely related polyisocyanates of higher molecular weight and functionality.

Thus the polyisocyanate (III) is inclusive of (a) polymethylene polyphenyl polyisocyanates which have a content of methylenebis(phenyl isocyanate) in the above range and which are derived by phosgenation of mixtures of polyamines obtained by acid condensation of aniline and formaldehyde; and (b) polyisocyanates having a content of methylenebis(phenyl isocyanate) in the above range obtained by chemical modification of methylenebis(phenyl isocyanate) itself and which are referred to herein as "modified" methylene-bis(phenyl isocyanates).

The modified methylenebis(phenyl isocyanates) are inclusive of methylene-bis(phenyl isocyanate), either 4,4'-isomer or mixtures of 4,4'-isomer and 2,4'-isomer, which has been treated to convert a minor proportion, generally less than 25 percent by weight of the starting material, to an artefact of said starting material. For example, the organic polyisocyanate can be methylene-bis(phenyl isocyanate) which has been converted to a stable liquid at temperatures of about 15° C [methylenebis(phenyl isocyanate) is normally a solid at ambient temperature and has a melting point of the order of 35 to 42° C] by heating at about 160° C to about 250° C in the presence of from about 0.1 to about three percent of a trialkyl phosphate such as triethyl phosphate. Said heating process can be carried out on a batch or continuous basis and the period for which the heating is carried out varies according to the reaction temperature employed. The conditions of heating time and reaction temperature required to convert any particular batch of methylenebis(phenyl isocyanate) to a stable liquid product can be readily determined empirically. Generally speaking, such treatments are carried out under such conditions that the isocyanate equivalent has changed from an initial value of 125, corresponding to the methylenebis(phenyl isocyanate) originally present as starting material, to a value in the range of 130 to 175. The processes employed in the preparation of the above materials are advantageously those described in U.S. Pat. No. 3,384,653.

Illustrative of other modified methylenebis(phenyl isocyanates) are the products obtained by treating methylenebis(phenyl isocyanate) [either pure 4,4'-isomer or mixtures of the latter with the 2,4'-isomer] with a minor portion of a carbodiimide in accordance, for example, with the procedure described in British Pat. No. 918,454. A minor proportion of methylenebis-(phenyl isocyanate) is thereby converted to the corresponding isocyanato-substituted carbodiimide and there is obtained a mixture of a major proportion of unchanged starting material and a minor proportion of said isocyanato-substituted carbodiimide.

The polymethylene polyphenyl polyisocyanates which can be employed as the polyisocyanate component (III) in the process of the invention are those which are well-recognized in the art and are obtained by phosgenation of mixtures of the corresponding methylene-bridged polyphenyl polyamines. The latter, in turn, are obtained by interaction of formaldehyde, hydrochloric acid and primary aromatic amines, such as aniline, o-chloroaniline, o-toluidine, and the like using procedures well-known in the art; see, for example, U.S. Pats. Nos. 2,683,730, 2,950,263 and 3,012,008; Canadian Pat. No. 700,026; and German Specification No. 1,131,877.

Said polymethylene polyphenyl isocyanates generally contain from about 35 to about 85 percent by weight of methylenebis(phenyl isocyanates) the remainder of said mixture being polymethylene polyphenyl isocyanates of functionality higher than 2.0. The overall average functionality of any particular mixture is, of course, directly related to the proportions of the various polymethylene polyphenyl isocyanates in the mixture. The latter proportions correspond substantially to the proportions of methylene-bridged polyphenyl polyamines in the intermediate mixture of polyamines which is phosgenated to obtain the isocyanate. The desired proportion of methylene-bridged polyphenyl polyamines in said mixture is generally controlled by varying the ratio of aniline, or other aromatic amines, to formaldehyde in the initial condensation. For example, using a ratio of approximately 4 moles of aniline to 1.0 mole of formaldehyde, there is obtained a mixture of polyamines containing approximately 85 percent by weight of methylenedianilines. Using a ratio of approximately four moles of aniline to about 2.6 moles of formaldehyde there is obtained a mixture of polyamines containing approximately 35 percent by weight of methylenedianilines. Mixtures of polyamines containing proportions of methylenedianiline intermediate between these limits can be obtained by appropriate adjustment of the ratio of aniline to formaldehyde.

A preferred polymethylene polyphenyl polyisocyanate employed in the process of the invention is one containing approximately 50 percent by weight of methylenebis(phenyl isocyanate) the remainder of said composition being polymethylene polyphenyl isocyanates of functionality higher than 2.0.

The polyisocyanate component (III) employed in the preparation of the high temperature resistant polymers of the invention also includes poly-methylene polyphenyl isocyanates, as defined above, which have been heat treated to render the viscosity more suitable for machine handling of the product. Such treatments are carried out at temperatures from about 150° C to about 300° C under such conditions that the viscosity (at 25° C) is increased to about 800 to 1500 centipoises.

Techniques of preparing cellular foams are well-known; for example, Nicholas and Gmitter, Journal of Cellular Plastics, pp. 85–90, January 1965, describe the preparation of polymer foams from isocyanate-terminated prepolymers (derived from toluene diisocyanate) and employing as catalyst a trialkylamino-hexahydrotriazine or a trialkylaminoalkylphenol alone or in combination with a polyepoxy resin.

In the process of this invention the prepolymer is brought together under foam forming conditions with a polyol (V) as hereinafter defined, and optionally with a monomeric homocyclic polyepoxide (IV) as hereinafter defined, blowing agents, surfactants, and catalysts including tertiary amine catalysts and/or other adjuvants, in the appropriate proportions using agitation means sufficient to ensure homogeneity in the resultant mixture. The mixing of the components in this way can be carried out by hand, when operating on a small scale, but is advantageously carried out using the various mixing and dispensing machines conventionally employed in the manufacture of polymer foams; see, for example, Ferrigno, "Rigid Plastic Foams", Reinhold Publishing Corporation, New York, 1963. The resulting foam mixture is dispensed into an appropriate mold or form and allowed to foam, rise and cure. The resulting rigid foam is then removed from its mold, and can be cut to any desired size and shape.

When the monomeric homocyclic polyepoxide (IV) is employed in the absence of a polyol (V), said polyepoxide (IV) must be present in at least the minimum amount, i.e. 0.0045 equivalent per equivalent of prepolymer, set forth above. Similarly when the polyol (V) is employed in the absence of any said poly-epoxide (IV), the polyol (V) must be present in at least the minimum amount i.e. 0.01 equivalent per equivalent of prepolymer, set forth above. When both the polyol (V) and the polyepoxide (IV) are employed together, the combined amount of these two components must be no more than 0.6 equivalent per equivalent of prepolymer.

The polyepoxide (III), which is used as a component of the foam generating mixture in carrying out the process of the invention, can be any monomeric homocyclic polyepoxide. Such epoxides are characterized by the presence of at least two epoxy groups each of which is present in a substituent attached to a cyclic hydrocarbon compound or is fused to a non-aromatic ring in a cyclic hydrocarbon compound. Examples of monomeric homocyclic polyepoxides are:

1. the glycidyl ethers of polyhydric mononuclear and fused ring phenols such as resorcinol, hydroquinone, pyrocatechol, saligenin, phloroglucinol, 1,5-dihydroxynaphthalene, 1,6-dihydroxynaphthalene, 1,7-dihydroxynaphthalene and the like;
2. the glycidyl ethers of non-fused polynuclear phenols represented by the general formula:

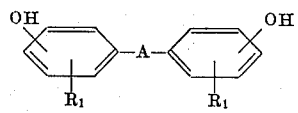

(a)

wherein $R_1$ represents from 0 to 4 substituents selected from the class consisting of halogen and lower-alkyl, A is a bridging group selected from the class consisting of

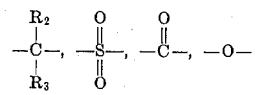

and a single covalent bond, wherein $R_2$ and $R_3$ each represent a moiety selected from the class consisting of hydrogen, lower-alkyl, lower-cycloalkyl and aryl. Illustrative of such compounds are the bis-(glycidyl ethers) of:
4,4'-dihydroxydiphenylsulfone,
4,4'-dihydroxybiphenyl,
4,4'-dihydroxybenzophenone,
di(4-hydroxyphenyl)methane (bisphenol F),
2,2-di(4-hydroxyphenyl)butane (bisphenol B),
2,2-di(4-hydroxyphenyl)propane (bisphenol A),
1,1-di(4-hydroxyphenyl)propane,
3,3-di(3-hydroxyphenyl)pentane,
2-(3-hydroxyphenyl)-2-(4-hydroxyphenyl)butane,
1-phenyl-1-(2-hydroxyphenyl)-1-(3-hydroxyphenyl)propane,
1-phenyl-1,1-di(4-hydroxyphenyl)butane,
1-phenyl-1,1-di(4-hydroxyphenyl)pentane,
1-tolyl-1,1-di(4-hydroxyphenyl)ethane,
bis(3-bromo-4-hydroxyphenyl)methane,
2,2-bis(3-bromo-4-hydroxyphenyl)propane,
bis(3-bromo-4-hydroxyphenyl)diphenylmethane,
1,1-bis(3-bromo-4-hydroxyphenyl)-1-(2,5-dibromophenyl)ethane,
bis(3,5-dibromo-4-hydroxyphenyl)methane,
2,2-bis(3,5-dibromo-4-hydroxyphenyl)propane,
bis(3,5-dibromo-4-hydroxyphenyl)diphenylmethane,
1,1-bis(3,5-dibromo-4-hydroxyphenyl)-1-(2,5-dibromophenyl)ethane,
bis(3-bromo-4-hydroxyphenyl)sulfone,
bis(3,5-dibromo-4-hydroxyphenyl)sulfone;

3. the glycidyl ethers of novolac resins. The novolac resins are the products obtained by acid condensation of phenol, or a substituted phenol, with formaldehyde and are conventionally represented by the general formula:

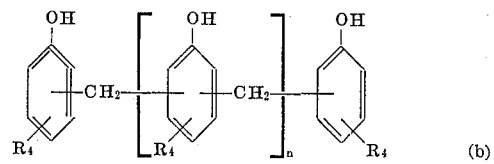

(b)

wherein $n$ has an average value of from about eight to 12 and $R_4$ represents from zero to four substituents selected from halogen and lower alkyl groups. It is to be understood that the above formula is highly idealized and is an approximation only; see, for example, Carswell, "Phenoplasts"29–35, Interscience, New York, 1947. A wide range of novolac resins of differing molecular weights is available commercially, all of which are represented approximately by the above formula. Since the class of novolac resins is so well recognized in the art, the epoxides derived therefrom by conversion of the novolacs to their glycidyl ethers (by conventional procedures e.g. reaction with epichlorohydrin) will be referred to hereafter as "novolac resin glycidyl ethers";

4. dicyclopentadiene dioxide i.e. the compound having the formula:

(c)

5. vinyl cyclohexene dioxide, i.e. the compound having the formula:

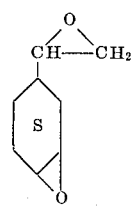

(d)

6. the dicyclohexyl oxide carboxylates represented by the general formula:

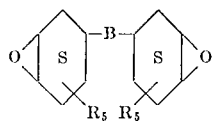

wherein $R_5$ in each instance represents from zero to nine lower-alkyl groups, and B represents a divalent radical selected from the class consisting of:

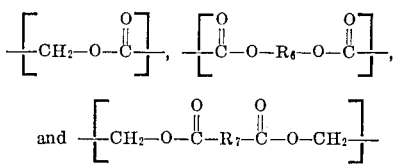

wherein $R_6$ is selected from the class consisting of lower-alkylene and lower-oxyalkylene and $R_7$ is selected from the class consisting of lower-alkylene and arylene. Examples of the dicyclohexyl oxide carboxylates are:

3,4-epoxycyclohexylmethyl 3,4-epoxycyclohexanecarboxylate,
3,4-epoxy-6-methylcyclohexymethyl 3,4-epoxy-6-methylcyclo-hexylcarboxylate,
bis(3,4-epoxycyclohexylmethyl)maleate,
bis(3,4-epoxycyclohexylmethyl)succinate,
ethylene glycol bis(3,4-epoxycyclohexanecarboxylate),
2-ethyl-1,3-hexanediol bis(3,4-epoxy-6-methylcyclohexanecarboxylate) and the like.

The term "lower alkyl" is used throughout this specification and claims as meaning alkyl containing from one to six carbon atoms such as methyl, ethyl, propyl, butyl, pentyl, hexyl and isomeric forms thereof. The term "lower-cycloalkyl" means cycloalkyl from four to eight carbon atoms such as cyclobutyl, cyclopentyl, cyclohexyl, cycloheptyl and cyclooctyl. The term "lower-oxy-alkylene" means alkylene, containing from one to six carbon atoms, interrupted by the radical —O—. The term "arylene" means a bivalent radical, such as phenylene, tolylene, xylylene, biphenylylene and the like, derived from an aromatic hydrocarbon by removal of a hydrogen atom from each of two carbon atoms of the nucleus. The term "aryl" means the moiety obtained by removing one hydrogen atom from an aromatic hydrocarbon of from six to 12 carbon atoms, inclusive. Illustrative of aryl moieties are phenyl, tolyl, xylyl, biphenylyl, naphthyl and the like.

The monomeric homocyclic polyepoxides described and exemplified hereinabove are, for the most part, well-known in the art and can be prepared by methods well-known in the art; see, for example, Lee and Neville, "Epoxy Resins", McGraw-Hill Book Company, New York (1957), U.S. Pats. Nos. 2,633,458, 2,716,123, 2,745,285, 2,745,847, 2,872,427, 2,884,408, 2,902,518, 3,268,619, 3,325,452, and British Pat. No. 614,235.

While any of the monomeric homocyclic polyepoxide compounds exemplified hereinabove can be used in the preparation of the high temperature resistant polymers of the invention, the preferred compounds for this purpose are those of the groups 2) and 3) set forth above, namely, the glycidyl ethers of non-fused polynuclear phenols represented by the formula (a) above, and the glycidyl ethers of novolac resins represented by the formula (b) above. The use of epoxides of these two classes gives rise to cellular polymers of the invention which possess the highest resistance to deformation by heat and the lowest flame spread rating of the cellular polymers of this class. Within this particular group of polyepoxides we have found that those which are derived from the phenols of formula (a) above wherein each of $R_1$ represents halogen are the most preferred since they give rise to cellular polymers having the highest resistance to flame spread.

The tertiary amines (VI) which are employed in accordance with the process of the invention are those which are more usually employed to catalyze the reaction between an isocyanato group and an active hydrogen atom.

Representative of said tertiary amine catalysts are: N,N',N''-trialkylaminoalkylhexahydrotriazines such as N,N',N''tris(dimethylaminomethyl)hexahydrotriazine, N,N',N''tris(dimethylaminoethyl)hexahydrotriazine, N,N',N''tris(dimethylaminopropyl)hexahydrotriazine, N,N',N''tris(diethylaminoethyl)-hexahydrotriazine, N',N',N''-tris(diethylaminopropyl)hexahydrotriazine and the like; mono-, di-, and tri(dialkylaminoalkyl) monohydric phenols or thiophenols such as 2-(dimethylaminomethyl)phenol, 2-(dimethylaminobutyl)phenol, 2-(diethylaminoethyl)phenol, 2-(diethylaminobutyl)phenol, 2-(dimethylaminomethyl)-thiophenol, 2-(diethylaminoethyl)thiophenol, 2,4-bis(dimethylaminoethyl)phenol, 2,4-bis(diethylaminobutyl)phenol, 2,4-bis(dipropylaminoethyl)phenol, 2,4-bis-(dimethylaminoethyl)thiophenol, 2,4-bis(diethylaminopropyl)thiophenol, 2,4-bis(dipropylaminoethyl)thiophenol, 2,4,6-tris(dimethylaminoethyl)phenol, 2,4,6-diethylaminoethyl)phenol, 2,4,6-tris(dimethylaminobutyl)phenol, 2,4,6-tris-(dipropylaminomethyl)phenol, 2,4,6-tris(diethylaminoethyl)thiophenol, 2,4,6-tris(dimethylaminoethyl)thiophenol and the like; N,N,N',N'-tetraalkylalkylene-diamines such as N,N,N',N'-tetramethyl-1,3-propane diamine, N,N,N',N'-tetra-methyl-1,3-butanediamine, N,N,N',N'-tetramethylethylenediamine, N,N,N',N'-tetraethylethylenediamine and the like; N,N-dialkylcyclohexylamines such as N,N-dimethylcyclohexylamine, N,N-diethylcyclohexylamine and the like; N-alkylmorpholines such as N-methylmorpholine, N-ethylmorpholine and the like; N,N-dialkylalkanolamines such as N,N-dimethylethanolamine, N,N-diethyl-ethanolamine and the like; N,N,N',N'-tetraalkylguanidines such as N,N,N',N'-tetramethylguanidine, N,N,N',N'-tetraethylguanidine and the like. The preferred tertiary amine catalysts for use in the process of the invention are the N,N',N''-tris(alkylaminoalkyl)hexahydrotriazines, the mono(dialkylaminoalkyl)-phenols, and the 2,4,6-tris(alkylaminoalkyl)phenols.

The amount of tertiary amine (VI) which is employed in the foam reaction mixture in preparing the cellular polymers of the invention can vary over a reasonably wide range depending whether a monomeric homocyclic polyepoxide (IV) is used. That is, when a monomeric homocyclic polyepoxide (IV) is used in conjunction with the tertiary amine (VI) it has been found advantageous to employ the tertiary amine in an amount corresponding to from about 0.01 to about 0.09 equivalent per equivalent of prepolymer and preferably from about 0.02 to about 0.05 equivalent per equivalent of prepolymer. When a monomeric homocyclic polyepoxide is not used in conjunction with the tertiary amine (VI), the amount of tertiary amine (VI) employed in the preparation of the novel high temperature resistant polymers of the invention is advantageously from about 0.01 to about 0.25 equivalent per equivalent of prepolymer and preferably from about 0.05 equivalent to about 0.15 equivalent per equivalent of prepolymer. By "equivalent" of tertiary amine is meant the chemical equivalent, i.e. the molecular weight of the tertiary amine divided by the number of tertiary amino groups present in the molecule. The equivalent weight is expressed in whatever units of weight, i.e. grams, pounds, tons, are employed to designate the other components of the reaction mixture.

The polyepoxide (IV), if used as a component in the preparation of the novel high temperature cellular polymers of the invention, is employed and is advantageously present in an amount within the range of about 0.0045 equivalent to about 0.5 equivalent per equivalent of prepolymer. Preferably, the polyepoxide (IV) is employed in the reaction mixture in an amount within the range of about 0.08 equivalent to about 0.2 equivalent per equivalent of prepolymer. The term "equivalent" used in respect to the polyepoxide (IV) means the molecular weight of the latter divided by the number of epoxy groups present in the molecule. The equivalent weight is expressed in whatever units, i.e. grams, pounds, tons, etc., are used to designate the amounts of the other components of the reaction mixture.

The polyols (V) which are employed in the preparation of the novel polymers of the invention advantageously are those having average hydroxyl equivalent weights (i.e. the polyol molecular weight divided by the number of hydroxyl groups) of from about 30 to about 1,500 and having from about two to about eight hydroxyl groups per molecule. Preferably, said polyols (V) have average hydroxyl equivalent weights of from about 90 to about 500 and have from about three to about six hydroxyl groups per molecule.

The amount of polyol (V) incorporated into the prepolymer reaction mix, if used, is advantageously at least 0.01 equivalent to about 0.3 equivalent per equivalent of prepolymer. Preferably, the polyol (V) is employed in an amount of from about 0.09 to about 0.2 equivalent per equivalent of prepolymer. The polyol (V) may be added to the reaction mix as a separate component or as a preformed mixture with one or more of the other components of the reaction mix.

Illustrative of polyols (V) falling within the above limits of equivalent weight and functionality which can be used in preparing the high temperature foams in accordance with the process of the invention are:

1. polyethers, for example, polyoxyalkylene glycols such as the polyoxyethylene glycols prepared by the addition of ethylene oxide to water, ethylene glycol or diethylene glycol, polyoxypropylene glycols prepared by the addition of 1,2-propylene oxide to water, propylene glycol or dipropylene glycol, mixed oxyethyleneoxypropylene polyglycols prepared in a similar manner utilizing a mixture of ethylene oxide and 1,2-propylene oxide; polyether glycols prepared by reacting ethylene oxide, propylene oxide or mixtures thereof with mono- and polynuclear polyhydric phenols, e.g. catechol, resorcinol, hydroquinone, orcinol, 2,2-bis(hydroxyphenyl)propane, bis(p-hydroxyphenyl)methane, and the like; polyethers prepared by reacting ethylene oxide, propylene oxide or mixtures thereof with aliphatic polyols such as glycerol, trimethylolpropane, 1,2,6-hexanetriol, pentaerythritol, sorbitol, sucrose of the alkyl glycosides, e.g. the methyl, ethyl, propyl, butyl, and 2-ethylhexyl arabinosides, xylosides, fructosides, glucosides, rhamnosides, etc.; polyethers prepared by reacting ethylene oxide, propylene oxide or mixtures thereof with alicyclic polyols such as tetramethylolcyclohexanol; polyols containing a heterocyclic nucleus such as 3,3,5-tris(hydroxymethyl)-5-methyl-4-hydroxytetrahydropyran, and 3,3,5,5-tetrakis(hydroxymethyl)-4-hydroxytetrahydropyran, or polyols containing an aromatic nucleus such as 2,2-bis(hydroxyphenyl)-ethanol, pyrogallol, phloroglucinol, tris(hydroxyphenyl)alkanes, e.g. 1,1,3tris(hydroxyphenyl)ethanes, and 1,1,3-tris(hydroxyphenyl)- propanes, etc., tetrakis(hydroxyphenyl)alkanes, e.g. 1,1,3,3-tetrakis(hydroxy-3-methylphenyl)propanes, 1,1,4,4-tetrakis(hydroxyphenyl)-butanes and the like;

2. polyol mixtures comprising a polyol adduct produced by mixing under hydroxyalkylation conditions from two to 20 molecular equivalents of ethylene oxide, propylene oxide, or 1,2-butylene oxide, or mixtures thereof, and one amine equivalent of a polyamine mixture, 100 parts of said polyamine mixture containing from 30 to 90 parts of methylene-dianilines, the remaining parts being triamines and polyamines of higher molecular weight, said polyamine mixture having been formed by acid condensation of aniline and formaldehyde; see, for example U.S. Pat. No. 3,423,344.

3. polyols obtained by the Mannich condensation of a phenolic compound with formaldehyde and an alkanolamine, and the alkylene oxide adducts thereof; see, for example, U.S. Pat. No. 3,297,597;

4. hydroxyalkylated aliphatic diamines such as N,N,N',N'-tetrakis-(2-hydroxypropyl)ethylenediamine;

5. hydroxyalkylated isocyanuric acid such as tris(2-hydroxyethyl)-isocyanurate, and the like;

6. polyester polyols prepared from dibasic carboxylic acids and polyhydric alcohols. The dibasic carboxylic acids useful in preparing the polyesters have no functional groups containing active hydrogen atoms other than their carboxylic acid groups. They are preferably saturated. Acids such as phthalic acid, terephthalic acid, isophthalic acid, succinic acid, glutaric acid, adipic acid, and pimelic acid are suitable. Anhydrides of these acids can be used also. The polyol component or components of the polyester are preferably trihydric alcohols such as trimethylolethane, trimethylolpropane, mannitol, 1,2,6-hexanetriol, glycerol, and pentaerythritol. Mixtures of two or more such polyols can be used. In addition a mixture of one or more of said trihydric alcohols with a minor amount of a dihydric alcohol such as ethylene glycol, diethylene glycol, 1,2-propylene glycol, 1,4-butanediol, cyclohexanediol, and the like, can also be used in esterification of the dibasic carboxylic acid.

Particularly useful polyols for employment in the process of the invention are those polyols containing phosphorus and/or chlorine and bromine such as: the polyester polyols based on chlorendic acid, tetrabromo phthalic acid and tetrachloro phthalic acid or the corresponding anhydrides thereof; see, for example, U.S. Pats. Nos. 2,865,869, 3,018,256, 3,058,925, 3,098,047, and 3,214,392. Generally, said polyester polyols are solid and require blending with a lower viscosity polyol before mixing with the various other components of the high temperature resistant cellular reaction mixture. Any of the above polyethers having viscosities, at 25° C, below about 20,000 centipoises can be used as diluents for the aforesaid halogenated polyester polyols provided that the overall hydroxyl functionality and equivalent weight of the resulting mixtures fall within the limits set forth above.

Illustrative of polyether polyols which can be used as diluents for the above halogenated polyester polyols are the polyoxyalkylene glycols such as those prepared from diethylene glycol, dipropylene glycol and the like, the alkoxylated aliphatic polyols such as alkoxylated glycerol, sorbitol, trimethylolpropane, pentaerythritol, 1,2,6-hexanetriol, and the like. Generally speaking, however, the preferred polyether polyols are the polyoxyalkylene glycols employed in an amount corresponding to from about 20 to about 50 percent by weight of the polyol mixture. The preferred polyester polyols are those comprising the product of reaction of chlorendic acid or the anhydride thereof and a polyhydric alcohol such as glycerol, trimethylolethane, trimethylolpropane and 1,2,6-hexanetriol.

When a polyol (V), as defined hereinabove, is employed as a component of the foam producing mixture, said polyol (V) can be added as a separate component to the reaction mixture, or it can be blended with any one or more of the other components.

The density of cellular polymers, as is well-known in the art, is regulated by incorporating appropriate amounts of extraneous foaming agents. Illustrative of said foaming agents are water (which generates carbon dioxide by reaction with isocyanate) and volatile solvents such as the lower molecular weight halogenated aliphatic hydrocarbons, namely those having boiling points of from about −40° to about 200° C, preferably from about −20° to about 110° C, for example, difluoromonochloromethane, trichloromonofluoromethane, dichlorodifluoromethane, chlorotrifluoromethane, 1,1-dichloro-1-fluoroethane, 1-chloro-1,1-difluoro-2,2-dichloroethane, and 1,1,1-tribromo-2-chloro-2-fluorobutane, and the like.

Generally speaking, the amount of foaming agent employed depends upon the desired density. Thus if low density foams, i.e. two to 10 pounds per cubic foot, are desired, the amount of halogenated aliphatic hydrocarbon is from about 5 to about 20 percent by weight based on the total formulation weight. When water is employed as a foaming agent, the amount required to produce foams of density within the above range is from about 0.2 parts to about 3 parts by weight based on the total formulation weight. If desired, a mixture of water and one or more of said volatile solvents can be used as a foaming agent.

Other optional additives such as dispersing agents, cell stabilizers, surfactants, flame retardants, and the like which are commonly employed in the fabrication of polymer foams, can be employed in the process of the invention. Thus a finer cell structure may be obtained if water-soluble organosilicone polymers are used as surfactants in the reaction mix. Organosilicone polymers obtained by condensing a polyalkoxy polysilane with the monoether of a polyalkylene glycol in the presence of an acid catalyst are representative of those surfactants which can be used for this purpose. Other surfactants such as ethylene oxide modified sorbitan monopalmitate or ethylene oxide modified polypropylene ether glycol may be used, if desired, to obtain better dispersion of the components of the foam mixture.

The cellular polymers of this invention prepared from the isocyanato-terminated prepolymers defined above possess markedly superior friability properties, while retaining high temperature and flame resistant properties, as compared with the polymers that are prepared under the same conditions from the corresponding free polyisocyanates.

Thus, the cellular products of the invention can be employed for all the purposes or which the currently produced cellular products are conventionally employed and are particularly suitable for applications where thermal resistance and low flame spread is required and exposure to vibration is a factor. For example, the cellular products of the invention can be employed as thermal barriers and as insulating materials for high temperature pipe line and ovens, machinery, automobiles, supersonic aircraft and also as missile components.

The following examples describe the manner and process of making and using the invention and set forth the best mode contemplated by the inventors of carrying out the invention but are not to be construed as limiting.

All parts are by weight unless otherwise stated.

The physical characteristics of the foams produced in the various examples, after aging 48 hours at room temperature (circa 25° C – 30° C) were determined as follows, unless otherwise stated:

Density: as determined by ASTM Test D-1622-63 expressed in lbs./cubic foot.

Closed Cells: as determined by air comparison pycnometer, expressed as percentage of total cells.

Friability: as determined by ASTM Test C-421-61, expressed as percent weight loss over a 10 minute period of time.

Flame Resistance: four to six specimen samples of the foam material to be measured are obtained having the dimensions, 0.5 inches thick × 1.50 inches wide × 5.0 inches to 8.0 inches long.

In turn, each specimen is positioned within a test chamber so that one end makes contact with a heating coil (Fisher Corp., Catalog 011-479-5V4) which has been pre-heated for 15 minutes.

The line voltage to the heating coil is maintained at 140 volts by an appropriate voltage transformer. Thusly, a temperature of about 930° F to about 970° F is obtained 1¼ inch above the surface of the electric coil. The period of time between ignition of the material and point of flame extinguish is measured in seconds. Pre- and post-test weighings are made of each specimen to determine weight loss of each specimen.

Averages of the specimens are computed for average weight loss and average time for flame to extinguish.

The test result of each foam material tested is expressed as:

Average weight loss (grams) per average time to extinguish (seconds).

EXAMPLE 1

Shows the preparation of a typical prepolymer (M).

To a covered kettle is added 134 parts PAPI[1](1. Polymethylene polyphenyl isocyanate containing approximately 50 percent methylene-bis(phenyl isocyanate); isocyanate equivalent 133; see PAPI product report, the Upjohn Co., Polymer Chemical Division, Kalamazoo Michigan.) and 6 parts 2,3-dibromo-but-2-en-1,4-diol[2](2. Available as dibromobutenediol; General Aniline and Film Corp., New York, New York.) The mixture is constantly agitated with a mixer and heated to 60° C by the application of external heat. The atmospheric air layer in contact with the mixture surface is replaced with a blanket of nitrogen gas. After 2 hours, the viscosity increase of the mixture appears to stabilize, indicating reaction has been completed. The mixture is transferred to containers, sealed, and allowed to cool. The resulting mixture has a viscosity of 1,650 cps at 25° C; isocyanate equivalent is 146.2 (theory 148.0). Upon standing for 4 days at circa 25° C the mixture reaches a maximum viscosity of 4,300 cps at 25° C.

EXAMPLE 2

EXAMPLE 2 a variation of the amount of diol (II) in preparation of prepolymer, and variations of diol (II).

Using the procedure set forth in EXAMPLE 1, but substituting 13 parts 2,3-dibromobut-2-ene-1,4-diol for the 6 parts used in EXAMPLE 1, a prepolymer (N) is obtained, having viscosity of 22,800 cps at 25° C.

Similarly, using the procedure described in EXAMPLE 1, but replacing 2,3-dibromobut-2-ene-1,4-diol by ethylene glycol; 1,4-butanediol; 1,6-hexanediol; 2,2-difluoro-1,3-propanediol; 2,2,3,3-tetrafluoro-1,4-butane-diol; 2,3-dibromo-1,4-butanediol; 1,4-but-2-enediol; 1,6-hex-2-enediol; 1,6-hex-3-enediol; 2,3-diiodo-2-butene-1,4-diol; 2,3-dibromohex-2-ene-1,6-diol; or 2- bromo-3-chloro-2-butene-1,4-diol there are obtained the corresponding prepolymers.

EXAMPLE 3

A high temperature resistant and flame resistant rigid foam (X) is prepared in accordance with the invention by handmixing two components prepared from the following ingredients and proportions:

Component A
140 parts of prepolymer (M) prepared by the process of EXAMPLE 1 is mixed with 11.5 parts of trichlorofluoromethane (Freon 11-B, DuPont) and 2 parts Dow Corning 193 surfactant (see Dow Corning 193 surfactant technical bulletin 05-146, dated February 1966, Chemical Products Division, Dow Corning Corp., Midland, Michigan).

Component B
Five parts N,N',N''-tris(dimethylaminopropyl)sym-hexahydrotriazine [prepared by the method of J.Graymore, Journal Chemical Society, pg. 1493 (1931)] is admixed with 11.5 parts of trichlorofluoromethane (Freon 11-B, DuPont) and 20 parts Hetrofoam 320, a polyester polyol, the reaction product of chlorendic anhydride and a polyhydric alcohol, manufactured by Hooker Chemical Corp. (see Hetrofoam 320, service bulletin no. 3013 dated October 1963, Hooker Chemical Corp., North Tonawanda, New York).

Components A and B are mixed together by agitation in a 1 quart paper cup for 5 seconds and the mixture is allowed to rise freely.

For purposes of comparison a second foam (Y) is prepared in the same manner, except that instead of 140 parts prepolymer (M) in component A, 134 parts of PAPI[3](3. Polymethylene polyphenyl isocyanate (supra).) is used. Foam (Y) serves as a control only and is not a foam prepared in accordance with the invention. The resulting foams (X) and (Y) were found to have the following physical characteristics:

|   | Foam(X) | Foam (Y) |
|---|---|---|
| Density, pcf | 2.24 | 2.32 |
| Closed cells | 92.9% | — |
| Friability | 16.6% | 32.7% |
| Flame resistance | 0.0300/17 sec. | 0.0295/25 sec. |

The above comparison shows clearly that Foam (X), prepared from an isocyanate-terminated prepolymer in accordance with invention possesses comparable fire retardant properties to a foam (Foam Y) prepared from the corresponding free polyisocyanate. However, Foam (X) is markedly superior in its friability properties.

EXAMPLE 4

Using the procedure set forth in EXAMPLE 3 for making Foam X but substituting in component A the prepolymer (N) as prepared in EXAMPLE 2 for the prepolymer (M) as prepared in EXAMPLE 1, and substituting 12.5 parts trichlorofluoromethane (Freon 11–B, DuPont) for 11.5 parts of the same compound in both components A and B, a high temperature resistant, flame resistant rigid foam is obtained with the following physical characteristics:

| Density, pcf | 2.22 |
|---|---|
| Closed cells | 89.4% |
| Friability | 7.7% |
| Flame resistance | 0.021/21 sec. |

Similarly, using the procedure described in EXAMPLE 3, Foam X, but substituting any of the prepolymers set forth at the end of EXAMPLE 2 for prepolymer (M), a high temperature resistant, flame resistant rigid foam of improved friability properties is prepared.

EXAMPLE 5

Using the procedure set forth in EXAMPLE 3 but substituting 4 parts N,N',N''-tris(dimethylaminopropyl)sym-hexahydrotriazine for the 5 parts used in component B, and adding 4 parts epoxy novolac type resin having a functionality of 2.0 (Epon 152, see technical bulletin SC:65–34 Shell Chemical Company) to component A, a high temperature resistant rigid foam is obtained with the following physical characteristics

| Density, pcf | 2.20 |
|---|---|
| Closed cells | 92.2% |
| Friability | 23.0% |
| Flame resistance | 0.022/13 sec. |

EXAMPLE 6

Using the procedure set forth in EXAMPLE 3 but substituting 2 parts of a block co-polymer of dimethylpolysiloxane polyethylene oxide surfactant (SF–1109; see, technical data bulletin SF–1109, General Electric Crop.) for the 2 parts Dow Corning 193 surfactant used in component A, and substituting 4 parts N,N',N''-tris(dimethylaminopropyl)sym-hexahydrotriazine for the 5 parts of that compound as used in component B, a high temperature resistant rigid foam is obtained with the following physical characteristics:

| Density, pcf | 2.46 |
|---|---|
| Closed cells | 89.5% |
| Friability | 19.9% |
| Flame resistance | 0.022/18 sec. |

We claim:

1. A low friability cellular polymer in which the major recurring polymer unit is isocyanurate which polymer comprises the reaction product obtained by reacting in the presence of a blowing agent;
   a. an isocyanate-terminated prepolymer, which is the reaction product of
      1. about 1 percent to about 10 percent by weight of a diol, selected from the group consisting of straight chain lower-alkylene diols having two to six carbon atoms, inclusive, straight chain lower-alkenylene diols, having four to six carbon atoms, inclusive, straight chain halo-substituted lower-alkylene diols having two to six carbon atoms, inclusive, and straight chain halo-substituted lower alkenylene diols having four to six carbon atoms inclusive, and
      2. from about 99 percent to about 90 percent by weight of a polyisocyanate containing from about 35 percent to about 85 percent by weight of methylenebis (phenyl isocyanate);
   b. from about 0.01 to about 0.25 equivalent, per equivalent of said prepolymer, of a tertiary amine trimerization catalyst;
   c. a polyepoxide having at least two epoxy groups selected from the class consisting of epoxy groups present in a substituent attached to a cyclic hydrocarbon compound and epoxy groups fused to a non-aromatic ring in a cyclic hydrocarbon compound said polyepoxide being present in an amount such that there are from 0 to 0.2 epoxy groups for each isocyanate group present in the reaction mixture; and
   d. from about 0 to 0.3 equivalent per equivalent of said prepolymer, of a polyol having an average functionality of from two to eight and an average hydroxyl equivalent weight of from about 30 to about 1500, provided that when no polyol (d) is present the polyepoxide (c) is present in an amount corresponding to from about 0.0045 to about 0.2 epoxy groups per equivalent of prepolymer (a) and further provided that when no polyepoxide (c) is present the polyol (d) is present in an amount of from about 0.01 to about 0.3 equivalent per equivalent of prepolymer.

2. A low friability cellular polymer in which the major recurring polymer unit is isocyanurate, which polymer comprises the reaction product obtained by reacting in the presence of a blowing agent;
   a. an isocyanate-terminated prepolymer, which is the reaction product of
      1. about 1 percent to about 10 percent by weight of a diol, selected from the group consisting of straight chain lower alkylene diol having two to six carbon atoms, inclusive, straight chain lower-alkenylene diol having four to six carbon atoms, inclusive, straight chain halo-substituted lower-alkylene diol having two to six carbon atoms, inclusive, and straight chain halo substituted lower-alkenylene diol having four to six carbon atoms, inclusive, and
      2. from about 99 percent to about 90 percent by weight of a polyisocyanate containing from about 35 percent to about 85 percent by weight of methylenebis (phenyl isocyanate).
   b. from about 0.01 to about 0.25 equivalent, per equivalent of said prepolymer, of a tertiary amine trimerization catalyst; and
   c. from about 0.01 to about 0.3 equivalent of a polyol having an average hydroxyl equivalent weight from about 30 to about 1500 and an average functionality of from two to eight.

3. The polymer foam of claim 2 wherein the tertiary amine is selected from the class consisting of N,N',N''-trialkylaminoalkylhexahydrotriazine, a mono-(dialkylaminoalkyl)phenol, a 2,4,6-tri(dialkylaminoalkyl)phenol and mixtures thereof.

4. The polymer foam of claim 2 wherein the polyol is a polyester polyol comprising the product of reaction of chlorendic acid and a polyhydric alcohol.

5. The polymer foam of claim 2 wherein the prepolymer is the reaction product of 2,3-dibromobut-2-ene-1,4-diol and polymethylene polyphenyl isocyanate containing approximately 50 percent by weight of methylenebis(phenyl isocyanate).

6. A low friability cellular polymer in which the major recurring polymer is isocyanurate which polymer comprises the reaction product obtained by reacting in the presence of a blowing agent;

a. an isocyanate-terminated prepolymer, which is the reaction product of
   1. about 1 percent to about 10 percent by weight of a diol, selected from the group consisting of straight chain lower-alkylene diol having two to six carbon atoms, inclusive, straight chain lower-alkenylene diol having four to six carbon atoms, inclusive, straight chain halo-substituted lower-alkylene diol having two to six carbon atoms, inclusive, and straight chain halo-substituted lower-alkenylene diol having four to six carbon atoms, inclusive, and
   2. from 99 percent to about 90 percent by weight of a polyisocyanate containing from about 35 percent to about 85 percent by weight of methylene bis (phenyl isocyanate);
b. from about 0.01 to about 0.25 equivalent, per equivalent of said prepolymer, of a tertiary amine trimerization catalyst;
c. a polyepoxide having at least two epoxy groups selected from the class consisting of epoxy groups present in a substituent attached to a cyclic hydrocarbon compound and epoxy groups fused to a non-aromatic ring in a cyclic hydrocarbon compound said polyepoxide being present in an amount such that there are from 0.0045 to about 0.2 epoxy groups for each isocyanate group present in the reaction mixture; and
d. from 0.01 to about 0.3 equivalent, per equivalent of said prepolymer, of a polyol having an average functionality of from two to eight and an average hydroxyl equivalent weight of from about 30 to 1500.

7. The polymer foam of claim 6 wherein the tertiary amine is selected from the class consisting of N,N',N''-trialkylaminoalkylhexahydrotriazine, a mono-(dialkylaminoalkyl)phenol, a 2,4,6-tri(dialkylaminoalkyl)phenol and mixtures thereof.

8. The polymer foam of claim 6 wherein the polyepoxide compound is a polyglycidyl ether of a phenolic compound selected from the class consisting of non-fused polynuclear polyhydric phenol having the formula:

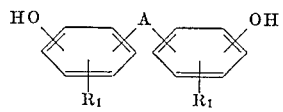

wherein $R_1$ represents from zero to four substituents selected from the class consisting of halogen and lower-alkyl, A is a bridging group selected from the class consisting of

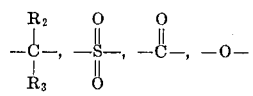

and a single covalent bond, wherein $R_2$ and $R_3$ each represent a moiety selected from the class consisting of hydrogen, lower-alkyl, lower cycloalkyl and aryl.

9. The polymer foam of claim 6 wherein the polyepoxide is a glycidyl ether of a novolac resin having the formula:

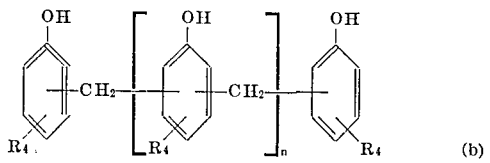

wherein $n$ has an average value of from about eight to 12 and $R_4$ represents from zero to four substituents selected from halo and lower alkyl groups.

10. The polymer foam of claim 6 wherein the prepolymer is the reaction product of 2,3-dibromobut-2-en-1,4-diol and polymethylene polyphenyl isocyanate containing approximately 50 percent by weight of methylendbis(phenyl isocyanate).

11. The polymer foam of claim 6 wherein the polyol is a polyester polyol comprising the product of reaction of chlorendic acid and a polyhydric alcohol.

12. A low friability cellular polymer in which the major recurring polymer unit is isocyanurate, which polymer comprises the reaction product obtained by reacting in the presence of a blowing agent;
a. an isocyanate-terminated prepolymer which is the reaction of
   1. about 1 percent to about 10% by weight of 2,3-dibromobut-2-ene-1,4-diol; and
   2. from 90 percent to about 99 percent by weight of a polymethylene polyphenyl isocyanate containing approximately 50 percent by weight of methylenebis(phenyl isocyanate);
b. from 0.01 to about 0.25 equivalents per equivalent of said prepolymer of a member selected from the group consisting of N,N',N''-trialkyl aminoalkyl-hexahydrotriazine, a mono(dialkylaminoalkyl)phenol, a 2,4,6-tri(dialkylaninoalkyl)phenol and mixtures thereof:
c. from about 0 to about 0.5 equivalents per equivalent of said prepolymer of a member selected from the group consisting of
   1. the glycidyl ether of a non-fused polynuclear polyhydric phenol of formula:

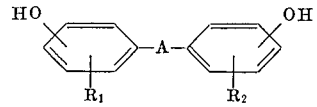

wherein $R_1$ represents from zero to four substituents selected from the group consisting of halogen and lower alkyl, A is a bridging group selected from the group consisting of

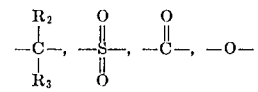

and a single covalent bond, wherein $R_2$ and $R_3$ each represent a moiety selected from the group consisting of hydrogen, lower-alkyl, lower-cycloalkyl and aryl; and
   2. the glycidyl ethers of novolac resins;
d. from about 0 to about 0.3 equivalents per equivalent of said prepolymer, of a polyol having an average functionality of from two to eight and an average hydroxyl equivalent weight of from about 30 to about 1500;
provided that when no polyol (d) is present, the member (c) is present in an amount such that there are about 0.0045 to about 0.2 epoxy groups for each isocyanate group present in the prepolymer (a) and further provided that when no member (c) is present, the polyol (d) is present in an amount of from about 0.01 to about 0.3 equivalents per equivalent of prepolymer (a).

* * * * *